United States Patent
Elliott

(10) Patent No.: US 10,830,673 B2
(45) Date of Patent: Nov. 10, 2020

(54) SERVO-ELECTRIC CONTROLLED AUTO SAMPLER SYSTEM

(71) Applicant: Edward J Elliott, Tempe, AZ (US)

(72) Inventor: Edward J Elliott, Tempe, AZ (US)

(73) Assignee: OIL & GAS PROCESS SOLUTIONS, Phoenix, AZ (US)

( * ) Notice: Subject to any disclaimer, the term of this patent is extended or adjusted under 35 U.S.C. 154(b) by 484 days.

(21) Appl. No.: 15/587,892

(22) Filed: May 5, 2017

(65) Prior Publication Data

US 2017/0322122 A1 Nov. 9, 2017

Related U.S. Application Data

(60) Provisional application No. 62/332,935, filed on May 6, 2016.

(51) Int. Cl.
| | |
|---|---|
| *G01N 1/20* | (2006.01) |
| *G01N 35/00* | (2006.01) |
| *G01N 35/10* | (2006.01) |
| *G01N 1/24* | (2006.01) |
| *G01N 1/14* | (2006.01) |

(52) U.S. Cl.
CPC ............. *G01N 1/2035* (2013.01); *G01N 1/24* (2013.01); *G01N 35/00732* (2013.01); *G01N 35/1016* (2013.01); *G01N 2001/1427* (2013.01); *G01N 2001/205* (2013.01); *G01N 2001/2057* (2013.01); *G01N 2001/2064* (2013.01); *G01N 2001/2071* (2013.01); *G01N 2001/242* (2013.01)

(58) Field of Classification Search
CPC .................................................. G01N 1/2035
USPC ........................................................ 73/863.03
See application file for complete search history.

(56) References Cited

U.S. PATENT DOCUMENTS

| 4,269,064 | A | * | 5/1981 | Johnson | G01N 1/2035 |
| | | | | | 73/863.82 |
| 2002/0189947 | A1 | * | 12/2002 | Paul | B01D 61/56 |
| | | | | | 204/461 |
| 2009/0211379 | A1 | * | 8/2009 | Reintjes | G01N 1/14 |
| | | | | | 73/863.23 |
| 2009/0301231 | A1 | * | 12/2009 | Wang | B01L 3/0265 |
| | | | | | 73/864.11 |
| 2016/0146712 | A1 | * | 5/2016 | Grans Ther; Eivind S | |
| | | | | | G01N 1/2035 |
| | | | | | 73/863.45 |

(Continued)

OTHER PUBLICATIONS

Welker, Inc., "Welker Refined Product Sampling", Mar. 21, 2016, 17pgs.

*Primary Examiner* — Walter L Lindsay, Jr.
*Assistant Examiner* — Philipmarcus T Fadul
(74) *Attorney, Agent, or Firm* — Bycer Law, PLC; Matthew L. Bycer

(57) ABSTRACT

A servo-electric actuated sampler can draw samples of fuel liquid from an operating main line. The sampler can run in a fast-loop process whereby liquid is drawn into the sampling system and past an actuated sampler and then out of the system back into main. The system main run a short loop whereby the main fast-flow is restricted, and the actuator and sampler are isolated from the main line flow. When isolated, the sampler discharges liquid into sampling cans. The servo-electric actuator requires a monitored amount of power to draw and discharge fluids. Monitoring of the power requirements of the servo-electric sampler can reveal the status and reliability of the system.

19 Claims, 11 Drawing Sheets

(56) References Cited

U.S. PATENT DOCUMENTS

2019/0277729 A1\* 9/2019 Yan .................... G01N 33/2823

\* cited by examiner

SERVO-ELECTRIC CONTROLLED AUTO SAMPLER SYSTEM

CROSS REFERENCE TO RELATED APPLICATION

The present application includes subject matter disclosed in and claims priority to a provisional application entitled "Servo-Electric Controlled Auto Sampler System" filed May 6, 2016 and assigned Ser. No. 62/332,935 describing an invention made by the present inventor which provisional is hereby incorporated by reference.

BACKGROUND OF THE INVENTION

1. Field of the Invention

The present invention relates to the field of measuring and testing fluid and more particularly, the present invention relates to controlled sample testing of fluid flow.

2. Description of Related Prior Art

To comply with Federal Energy Regulatory Commission (FERC) rules and in accordance with the American Petroleum institute (API), it is known and required to take product samples of—historically, for every 80 feet parcel of flowing product. For instance, if there is a flow of 20 feet per second, a sample most be drawn every 4 seconds. Multiple devices designed to accomplish this grabbing of samples from flowing petroleum products. Typical samples may be drawn of 10 cubic centimeters (cc). When multiple samples are taken in a single grabber or sampler, multiple receivers may be used, one for each specific time period. Each sample take can also be known as a grab or bite or sample. For crude oil sampling, die recent issuance of API 8.2 MPMS third edition (2015) determines sampling frequency by using a statistical error basis. More specifically, a minimum of 9064 sample grabs per batch of flowing product gives a desired maximum 0.0.1 margin of error. With variance of batch-size and a fixed volume of the receiver(s), the ability to vary both the grab size and frequency is advantageous when a minimum and/or maximum, collected volume is desired. For instance sampling a 906,400 gallon batch into 4 gallon (15,141 cc) receiver, it is required to collect one 1.67 cc sample per every 100 gallons. Now if 8 gallons was required to be collected, a grab size of 3.34 cc every 100 gallons OR 1.67cc sample per every 50 gallons would meet the requirement.

As known in the prior art, spring-loaded piston or pneumatic pistons are often manually adjusted to set the sample grab size.

Present day pump volume regulators include pneumatic piston pumps and spring-loaded volume regulators. For instance, a present day prior art volume analyzer can be driven by a pneumatic piston pump. A bite checker or volume analyzer monitors samples and pump volume. The device includes a single inlet and a single outlet functioning at atmospheric or low pressure. Similarly, overflow purge must travel into a low pressure, or atmospheric pressure, drain pan, tank or sump. Given that the system is pneumatically driven, the system requires a separate pneumatic driver to power the piston pump. Furthermore, the pneumatic driven sampler also relies on air pressure actuation of air valves. Pneumatic driven samplers provide no active control of the speed of the pump nor control of the volume. In effect, the device signals pump actuation and moves through an entire stroke at a speed determined by the power provided by the pneumatic system and friction/resistance therein. The power provided by the pneumatic system can vary based on processing conditions and through the stroke. An optional manual positioned-limited-switch to indicate the end of stroke may also be used to show position of stroke, but this also suffers the flaw of manual oversight requirement.

Other current volume regulators include spring-loaded volume regulators. Spring-loaded volume regulators typically me an atmospheric or low pressure drain. A drain typically leads to a remote container which may or may not be under atmospheric pressure, for proper disposition (e.g. to a tank, to be injected back into pipe line, sent to a flare etc.). Given the spring-loaded nature of the system, sample size is limited to a very small size and a small range. In order to achieve a larger volume sample size with a spring-loaded volume regulator, additional volume regulators must be used. Spring-loaded volume regulators rely on process pressure to compress the spring—and overcome friction to draw the low sample and also rely on gravity and the energy consequently stored in the spring for discharging of the sample down into a can. One drawback of spring-loaded volume regulators is the typical use of a 3-way valve which can close suddenly and deadhead the system in a fast loop. In order to achieve required flow rates and volume, sometimes these valves on the discharge side will be required to close swiftly and thereby interrupt the product flow thereby causing a jolt in the product flow to deadhead the system. Product in the sampler can also stagnate and therefore require periodic purging to clear out the system. Purging is achieved by multiple cycling of the valve and regulator several times to clear out the system. Similar to pneumatic systems, overflow and purge is placed into a sump or drain at atmospheric or low pressure. Spring-loaded volume regulators can only dump to atmospheric or low pressure vessels, typically under 15 pounds per square inch (psi), and depend on spring force, gravity, the viscosity of the liquid, and restriction of the plumbing. Spring-loaded volume regulators also suffer from the lack of any active control of speed or volume. Speed in such systems is determined by opening of the 3-way valve and the pressure from the flow input. Spring-loaded, systems also suffer from friction that can develop in the system and prevent or limit the discharge and thereby affect sampling.

Therefore, there exists a need for controlled sampling.

It is therefore a primary object of the present invention to provide regulated sampling of flow.

It is another object of the present invention to provide a servo controlled variable draw sampler.

It is yet a further object of the present invention to provide a measured draw sample of product flow.

It is yet a further object of the present invention to provide controlled injection of sampling cans.

It is yet another object of the present invention to monitor sample draws.

These and other objects of the present invention will become apparent to those skilled in the art as the description thereof proceeds.

SUMMARY OF THE INVENTION

The auto sampler system of the present invention utilizes a servo-electric pump for drawing samples of flow and moving such samples into sampling cans. The auto sampler of the present invention can work on a fast loop off of a main. By allowing the entire fast loop flow to enter and exit the sampler, this ensures a fresh representative sample is available at all times. The auto sampler is adaptable for direct crude sampling or direct pipeline draw, and can handle constant pressure applications such as natural gas liquids (NGL). By using a servo-electric sample pump, the servo can drive a desired speed and position to get the particular sample required. The servo-electric sample pump can be scalable for varied volumes and pressures of flow to produce desired sample sizes. Furthermore, the servo-electric sample pump has the advantage of allowing a constant velocity steady grab that can be paced to meter as is necessary, at a constant rate if required. Furthermore, the servo can be programmed for predefined index grabs of the same or varied grab sizes.

By using the servo, the system can determine how much volume is being drawn, and the viscosity of the inflow based on the amperage required to drive the servo-electric. The auto sampler of the present invention can integrate existing programmable logic controllers. The valving in the auto sampler of the present invention can use any various valving, including pneumatic hydraulic, or electric, operated valving to coordinate with the servo-electric pump sampling. In addition, to calibrate or provide redundancy to the servo sampling, weigh scales can be provided under sampling cans to verify weight of collection samples. Monitoring of power needed to drive the hydraulic arm and/or servo-electric actuator can help understand operation of system, potential issue or problems with connections or components, etc.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
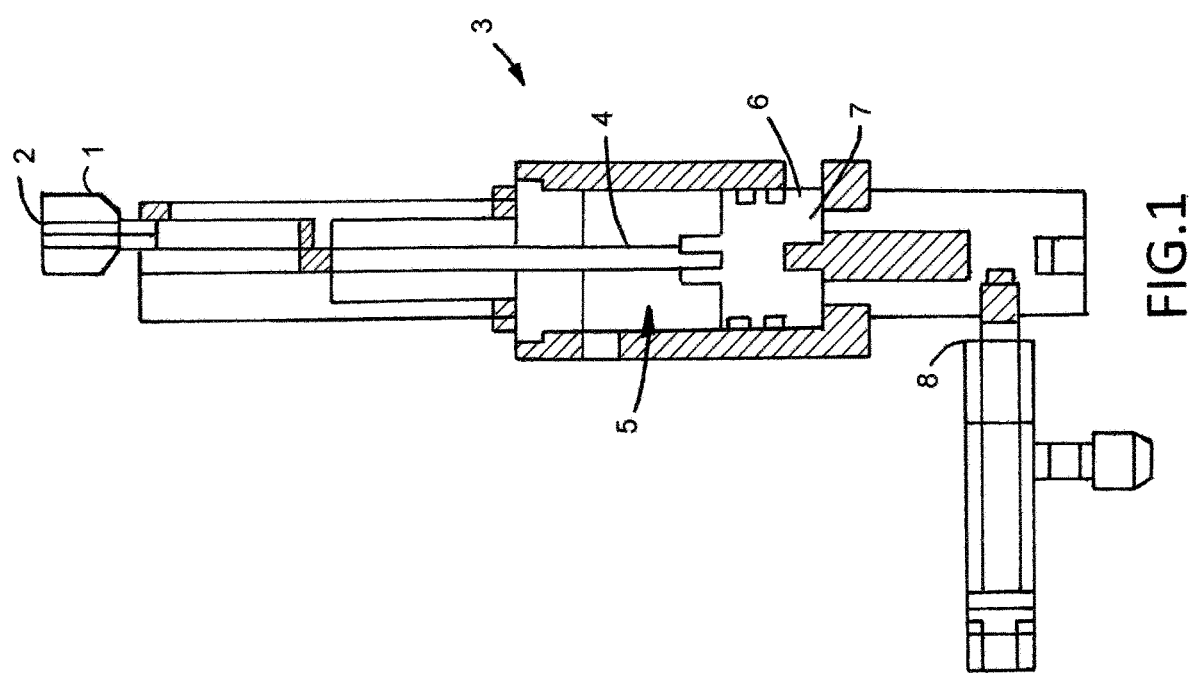
FIG. 1 illustrates a prior art pneumatic actuated sampler.

The present invention includes a novel servo-electric sampling system. Speed and distance of the actuated arm can be monitored and measured, along with the power to drive the actuated arm to draw and dump samples. The actuator can be remotely controlled and programmed to provide specified volumes, timing, and speed of sampling. Additionally, the new servo-electric sampling can include extremely slow draws of samples that are controlled. Feedback and diagnostic systems can signal, report, or otherwise indicate a problem with the system. Furthermore, the system can include additional programming to compensate if an error or issue is detected, for instance a blocked line, malfunctioning can valve, etc. and can be bypassed, repaired, or compensated as needed.

One aspect of the present invention is the use of a programmable servo electric actuated grabber that can take similar and/or controlled volume varied sample sizes in predetermined or programmable sequences. A linear servo-driven grabber can distinguish variable volume timing and speed for sample grabbing. For instance, if a sample is required, the servo actuator can run at a much slower and more constant pace to draw a sample. This is especially useful when slow grabs or infrequent grabs, or multiple grabs can be drawn together to pull a sample. In such an instance, the servo can draw a long draw (e.g. 20-second draw) into linear actuator, and is not restricted to the speed size or timing of prior art spring-loaded and pneumatic piston bites. For example, the servo-electric drawn actuator can pull at a set rate of one cubic centimeter per second for 50 seconds combining samples for a single dump at a standard constant rate. In such example, a 50 cc sample is obtained. Another feature of the present invention is the programmable sample sizing and speed. Servo-electric pump can be programmed via remote connection to modify sample grabs based on requirements as time goes.

A typical pipeline includes 20-40 inch main lines that are under lower (less than 100 psi) pressure. However, depending on the product through main line, pressures can range from 30 psi to 2000 psi. The servo electric drawn sampling system of the present invention can currently handle low and very high pressures as high as and beyond 1000 psi and may be soon constructed to handle pressure in excess of 2000 psi. Furthermore, the system can detect failures of the sampling if, for instance, pressures are beyond capacity or any other failure in the system. This may provide immediate indication that the actuator is not working. Failure may be due to a variety of reasons, such as a difference in required draw force to pull, or failure to draw sample. This can be indicated and communicated to a controller to immediately indicate a problem with the system. This problem can be diagnosed on the fly to correct or repair system, without losing excessive sampling time or opportunities on the sampler. This contrasts prior art systems whereby manual overview for weigh scale on receivers is required to diagnose problems in the system.

Figure 2:
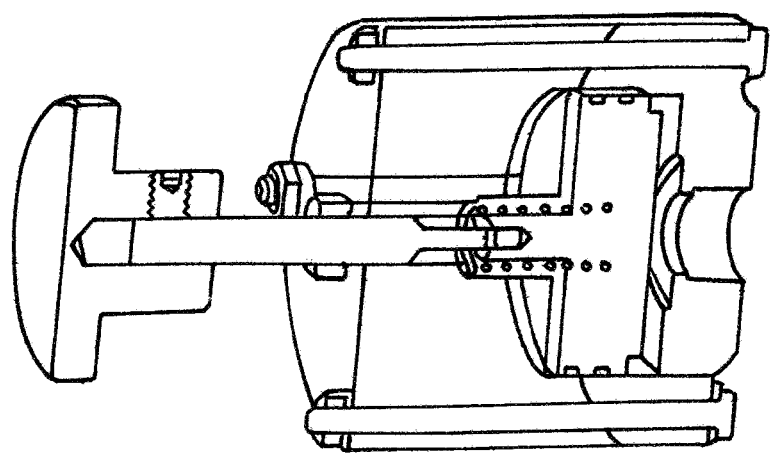
FIG. 2 illustrates a prior art spring actuated sampler.

Referring to prior art systems of FIG. 1 and FIG. 2, a pneumatic and spring actuator are shown. Pneumatic power source 1 is provided along air/gas conduit 2. Inflow 8 allows fluid, from main line to pass under actuator 3. Pneumatic actuator 3 drives rod 4 to push or pull piston 5 to move seal 6 within system to dump or take sample in cavity 7. Similarly, in FIG. 2, spring provides power to drive piston.

Figure 3:
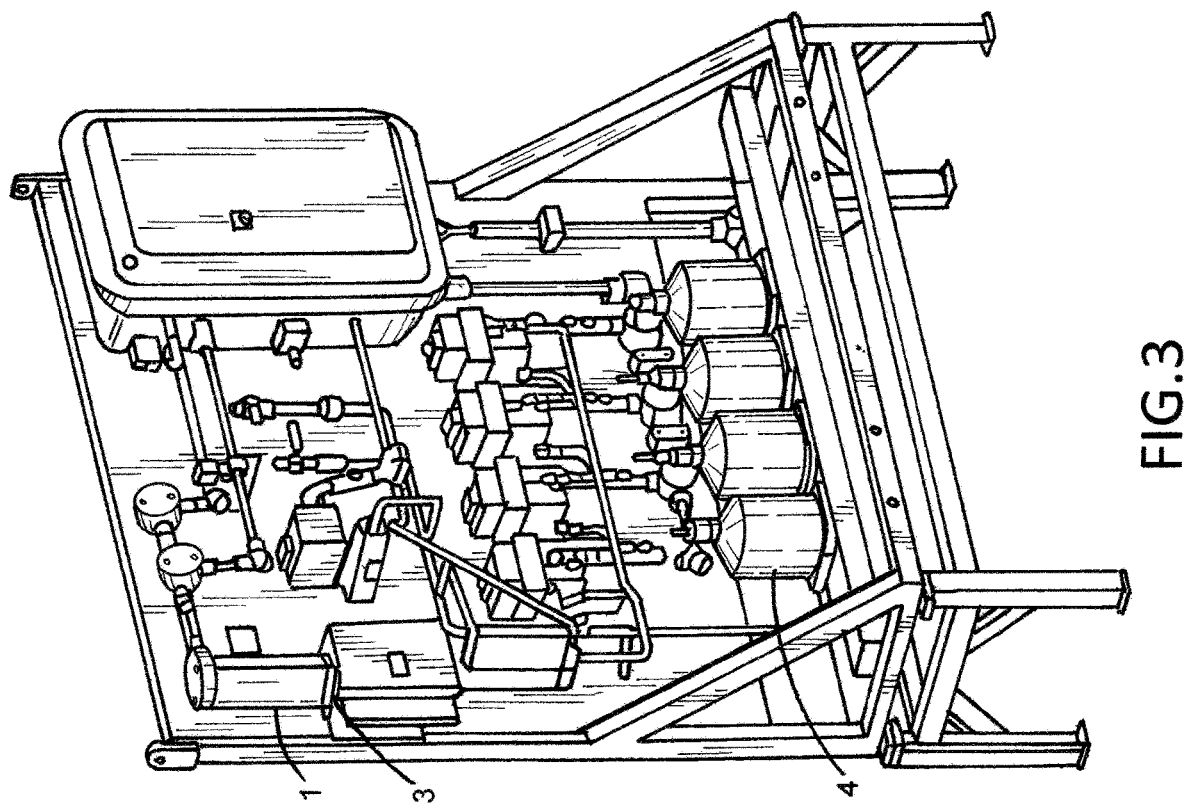
FIG. 3 illustrates a diagram of a sample system embodiment of the present invention.

Referring to FIG. 3, actuator 1 provides draw or pull (system pressure is present, usually vacuum conditions are not experienced) to allow flow running past actuator to draw into hydraulic cylinder 3. Actuator 1 can then force/push sample in actuator through linear actuator into sample receivers 4.

Figure 4:
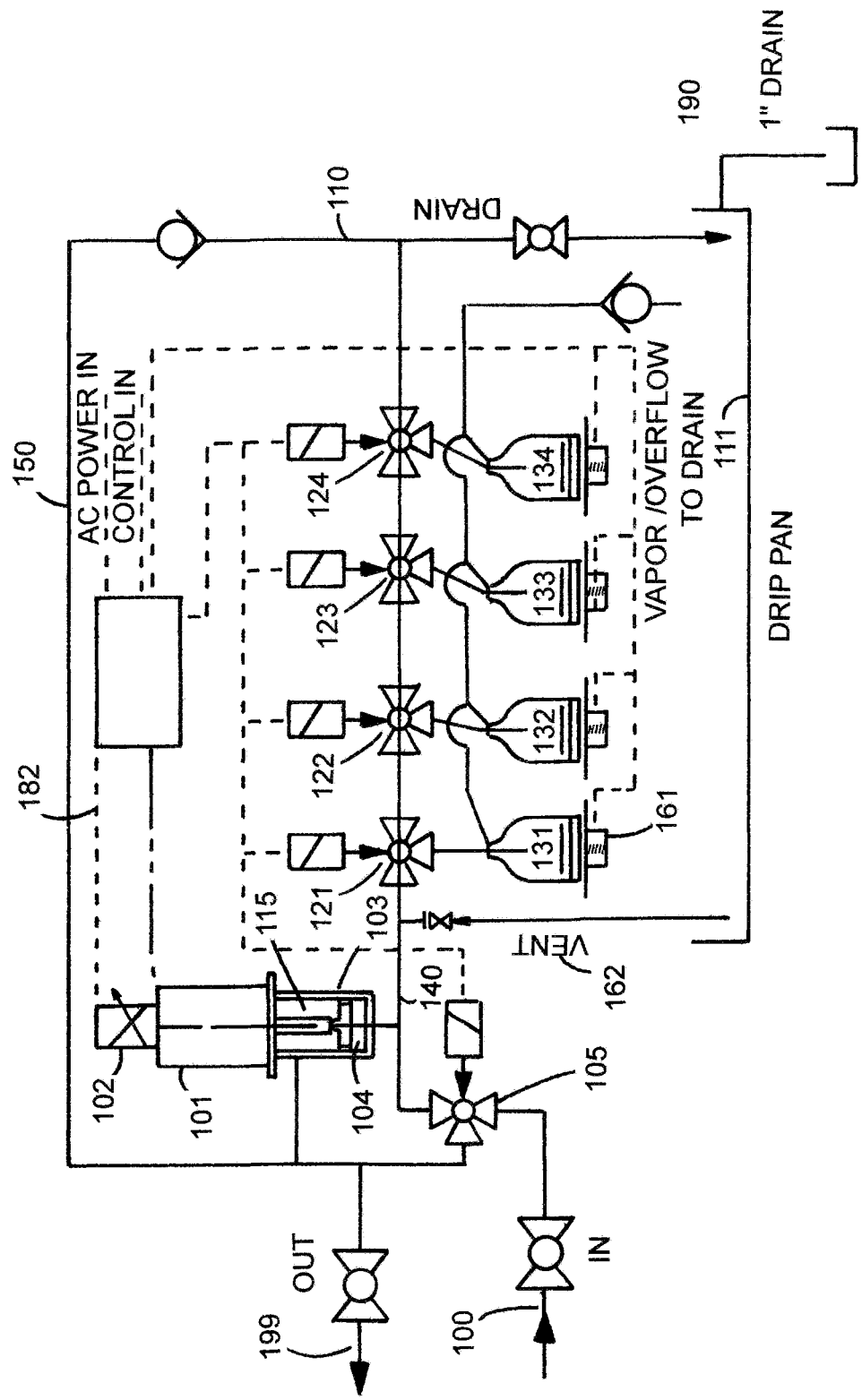
FIG. 4 illustrates a diagram of a working sampler system embodiment of the present invention.

Referring to FIG. 4, the typical grab sequence is illustrated in a fast loop process with at least one, and as many as four or more, sampling receiver(s) (four sampling receivers shown). Flow moves in through fast loop process source 100 from main (not shown) and out exit 199 back into main. Additionally, drainage may occur around top loop 110, into drip pan 111, or drain 190. On a typical grab sequence, actuator 102 is activated through electrical power in 182, with electric charge, to draw servo-electric pump arm 103 up to pull sample into sample space 104. Once the sample is taken, the fast loop is closed as three-way control valve 105 is closed to bypass flow through a short loop whereby fluid is drawn, and directed directly from control valve to exit 199.

While control valve is closed (short loop), sampling cans are isolated from main line. At this time, any one of sampling valves 121, 122, 123, 124 can open to allow sample to flow into one of receivers 131, 132, 133, 134, respectively. To dump sample, servo draws actuated arm 1-5 down to push sample out of sample space 104 through line 140 into a can through one of the can valves that may be opened. Next can valve 121 is closed and flow resumes through horizontal draw line 140 until control valve 105 is then drawn back into original position to allow fast loop continue to flow through process tubing 150. Because product runs continuously through the sampler during last flow (past control valve 105, can valves and through top loop in process tubing 150 out exit 199), no purge cycle is required as the flow of product itself constantly purges sampling system. Power is provided along power line 182 to supply actuator 101. Actuator 101 drives rod or arm 115 to move seal 103 and modify sample space 104 to draw or purge sample. Drip pan 111 may be included for over flow or fluid or vapor, etc. Scales 161, 162, 163, and 164 may be used with respective cans to provide a backup measurement of the weight of canister content. Vent 162 may be included to provide for gases to escape during fast flow process.

Considering electric actuated ball valves and "large" 50 cc grab sizes, on a regular draw cycle, it is contemplated that a normal complete cycle time may be approximately 16 seconds whereby the sequence follows through the following; Begins on fast loop a draw cylinder pump (here an estimated 50 cc) acts for two seconds. During fast loop, control valve 105 is open. Next control valve 105 is bypassed 90 degrees for 11 seconds to run fluid in short loop. Can valve 121 opens to can 131 for 3 seconds. Next, cylinder pump 101 actuates arm 115 down to inject or push sample through can valve 121 into can for 2 seconds. Can valve 121 then closes 3 seconds. For the last remaining 3 seconds, control valve 105 returns to normal position to allow fast flow through in standard fashion. In a preferred embodiment, fast loop flows through a ball valve to a 3-way actuated control valve in the inflow process. Flow is run through process tubing 150 into servo actuator 101 or through system to out loop 199 or drain 190. Each of the can samplers is actuated through a 3-way actuated can valve to allow the receiver (or can) access to the injected flow as it is injected via servo pump. The electro server provides a metered sample grabber or actuated arm to draw and push sample flow.

Figure 5B:
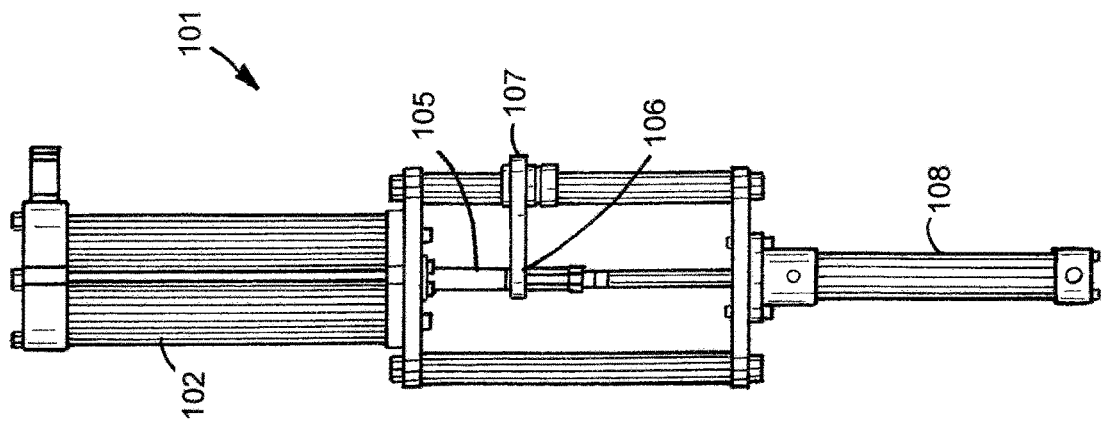
FIGS. 5A and 5B demonstrate the electric actuator in closed and open position, respectively.
Figure 5A:
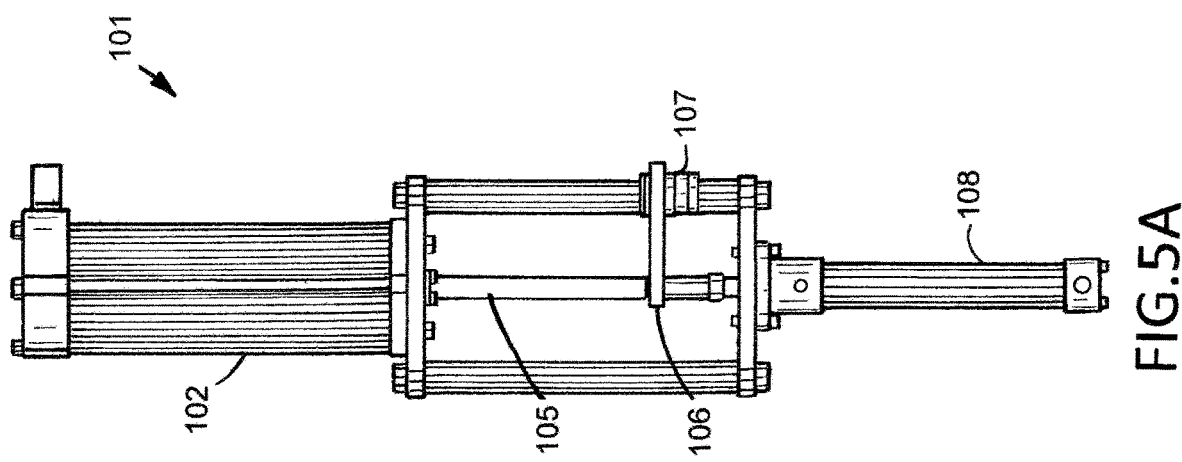
Figure 6:
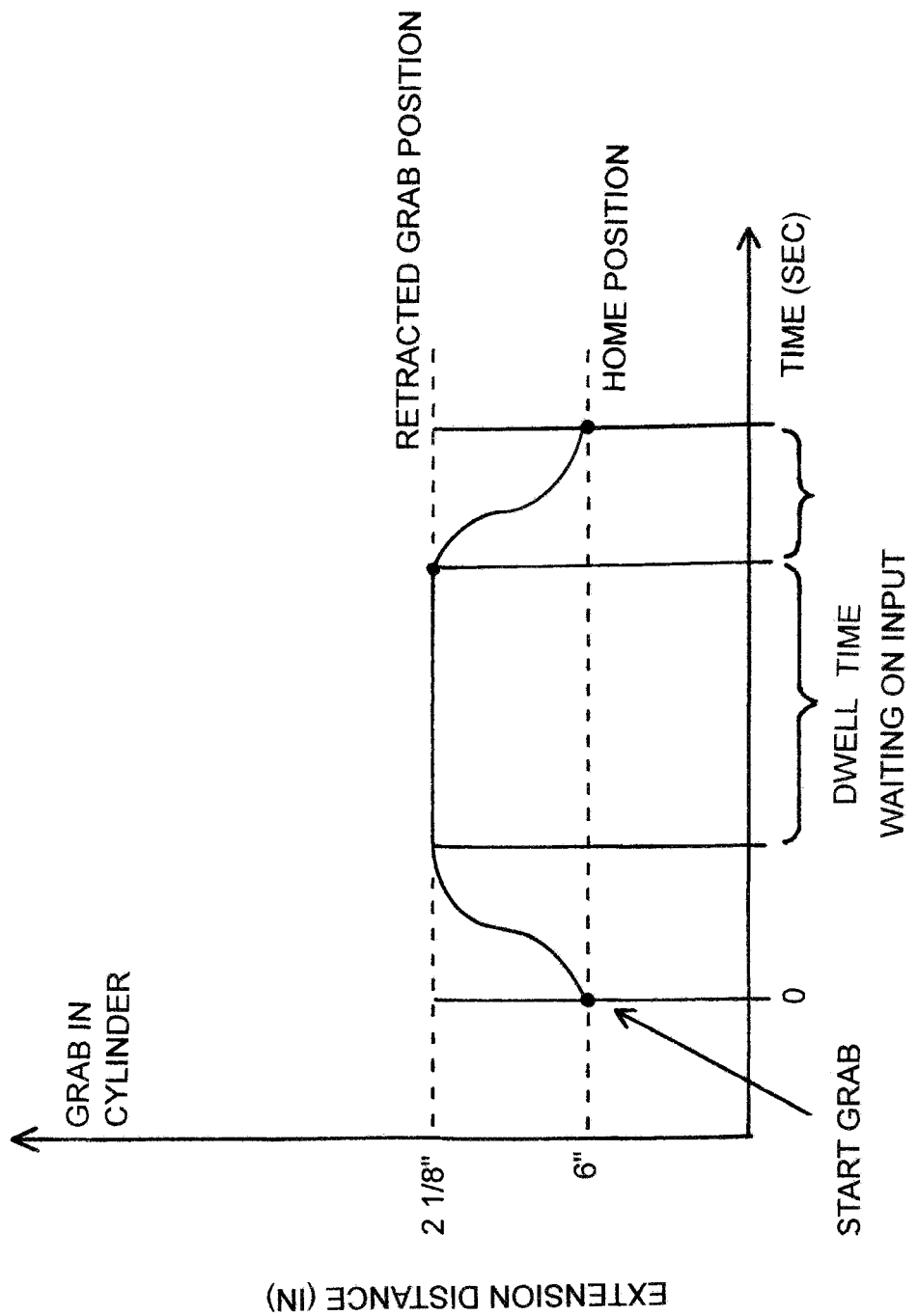
FIG. 6 demonstrates a diagram of actuator arm distance in a grab sequence.

Referring now to FIGS. 5A and 5B, servo-electric actuator is shown as linear device for drawing samples. A preferred electric actuator is that provided by EXLAR particularly the EL30series. The preferred servo drive is provided by A-M-C. Electric actuator draws hydraulic cylinder to function as driven piston pump. Electric actuator 101 is connected via coupling to hydraulic cylinder 108. Actuator 101 draws rod 115 along coupling to move hydraulic cylinder 108. An anti-rotation device 107 may also be used to ensure that actuator functions properly. The anti-rotation device prevents the lead screw from turning with the internal motorized nut to ensure proper operation of the linear actuator. As seen in the example shown in graph of FIG. 6, extension distance is shown on the vertical axis and time is shown on the horizontal axis. At time zero, grab starts where servo extension is initially at 6 inches (closed) and over 1.25 seconds draws up to open at approximately 2⅛th inch, to pull in sample. For approximately a quarter of a second, the servo actuator is open to allow waiting for input during dwell time. After dwell time, servo draws down from 2⅛th inch to 6 inches to purge and inject flow sample into receiver can. The linear actuator has returned to home position.

Figure 7A:
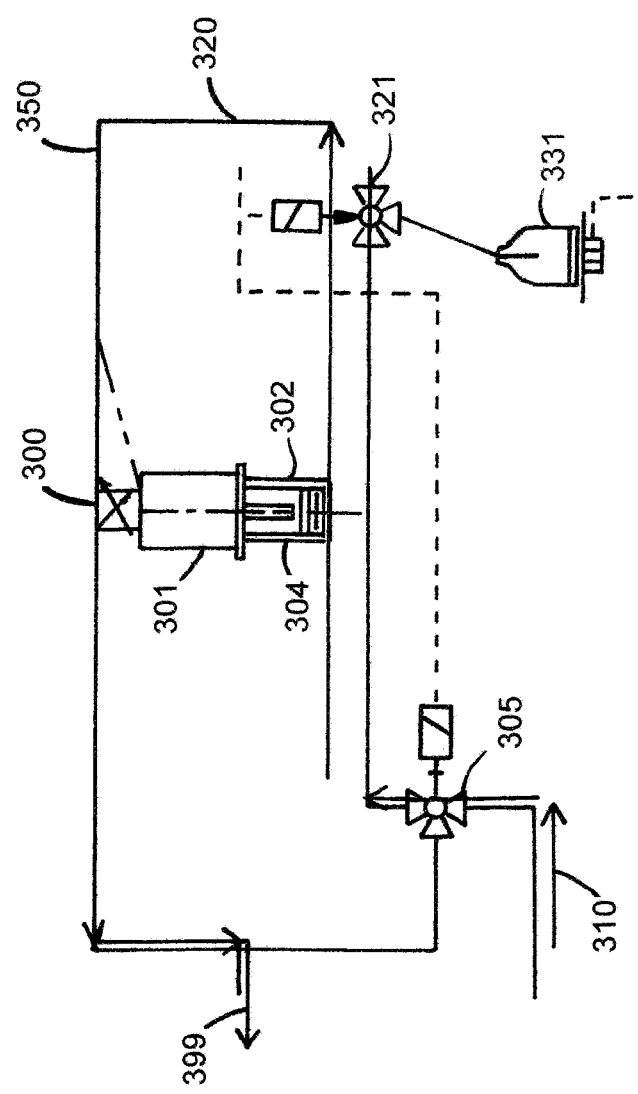
FIG. 7A demonstrates the last flow process diagram of an embodiment of the present invention.
Figure 7B:
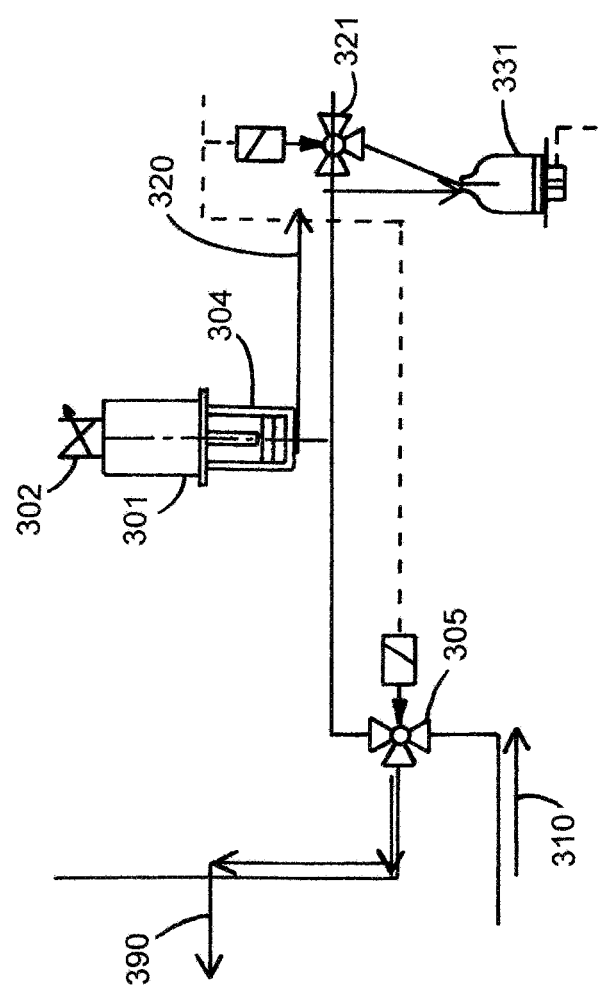
FIG. 7B demonstrates the short flow process diagram of an embodiment of the present invention as shown in FIG. 7A.
Figure 7C:
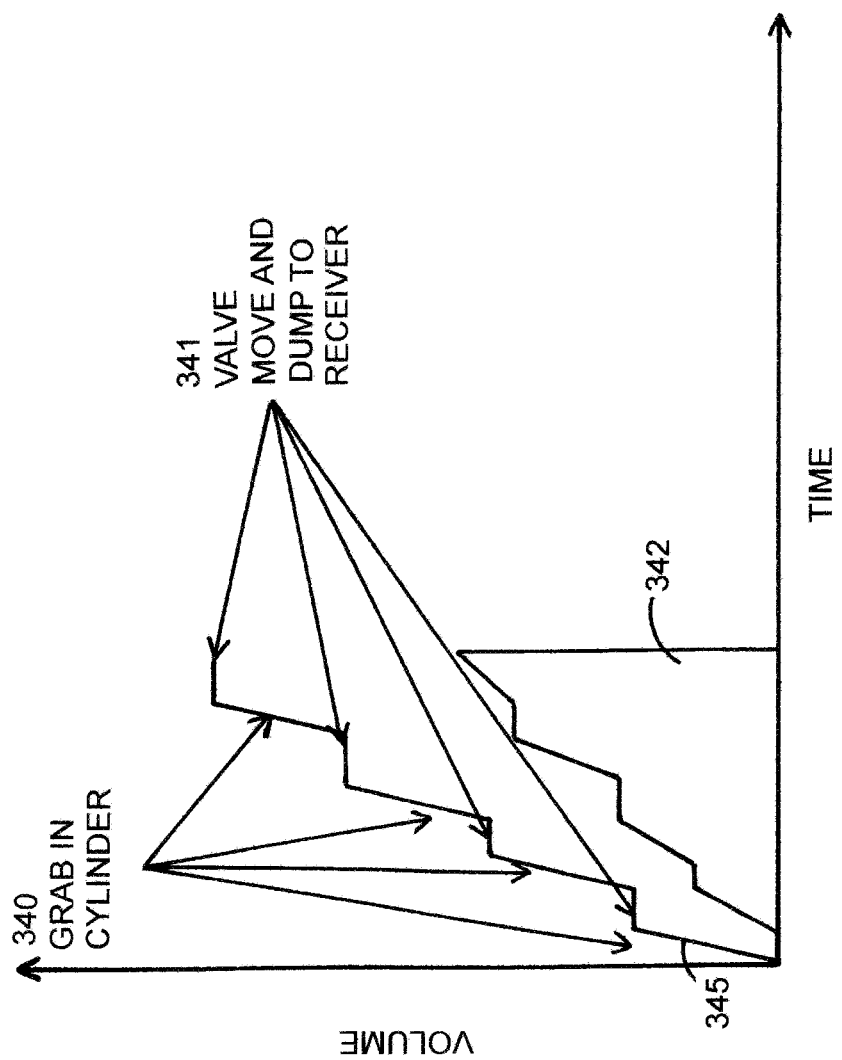
FIG. 7C graphs the grab volume during the sampling taken in process demonstrated during fast flow and short flows of FIGS. 7A and 7B.

As can be seen on FIG. 7A-7C, a typical grab sequence 300 with a single grab per cycle is shown. It is estimated that a single grab per cycle is applicable when draw times allow for servo actuator to act to pull requisite sample. As can be seen green line in FIG. 7A, when 3-way control valve 305 is open for sampling system, flow 320 draws through process line 350 past servo actuator 301. Linear actuator 302 and servo controlled actuator 302 draw sample into metered grab sampler 304. One specific feature of the present invention includes the continued flow along 320 in from main 310 and out through exit back to main 399, while going past servo actuator 301 and past sampling can valve 321 to allow flow to continue through system around in counter-clockwise. In FIG. 7A, system is considered that fast loop as main flow 320 runs in and out of the system though main process tubing 350. When 3-way control valve 305 is opened, the fast loop is opened to allow flow to be directed through the sampler from the fast loop. Note also this purges the sampler every time 3-way control valve 305 is opened for fast loop sampling. As seen in FIG. 7B, at such time as sample is necessary to be drawn into actuator for sampling in grabber, 3-way control valve 305 is closed and last loop is restricted. Flow 390 continues in the from main source 310 bypassing the sampler and out exit 399. When 3-way control valve 305 is closed, servo actuated grabber 301 can purge or inject flow via flow line 320 through opened 3-way can valve 321 into sampling can 331.

As can be seen in FIG. 7C, the flow of a simple one grab per cycle is shown. Referring to FIG. 7C, on the vertical axis is volume, on the horizontal axis is time. Line 345 demonstrates the volume in the grab cylinder and the section 342 demonstrates the volume of sample in the container. Each sample grab is shown as a diagonal rising line over time as a grab 340 is drawn into cylinder. Horizontal lines 341 on line 345 demonstrate when 3-way control valve is closed to allow injection into receiver, container, or can (any receptacle container capable of holding sampled material suffices for "can" herein. Note: The words receiver and can are both used in this disclosure, and a receiver can allude to any receiving device, and a "can" can refer to a holding device, in which a "can" can act as a receiver, and a receiver can be comprised of a "can"). This is also known as dump to receiver. In such way, receiver can volume can include predetermined amounts of sample, over time, for testing.

If sample grab rates required are too quick or too short to allow time for the valve actuation, the sample pump cylinder can be used to continually draw sample at a specific pace. Once a specific number, or required volume, or required number of samples, is in actuator 301, the system can dump several grabs together at once into a single can, e.g. 331. As shown in FIG. 7A, flow 350 includes draw into servo actuated grabber 301 for multiple grabs during fast loop flow 300. Arm 302 is drawn up partially with each grab sequence. As shown in FIG. 7B, 3-way control valve 305 is closed, ending fast loop, as flow 351 enters 310 and directly exits 390. Electro servo actuator 301 can thereby dump through 3-way can valve 321 into container 331.

Figure 8:
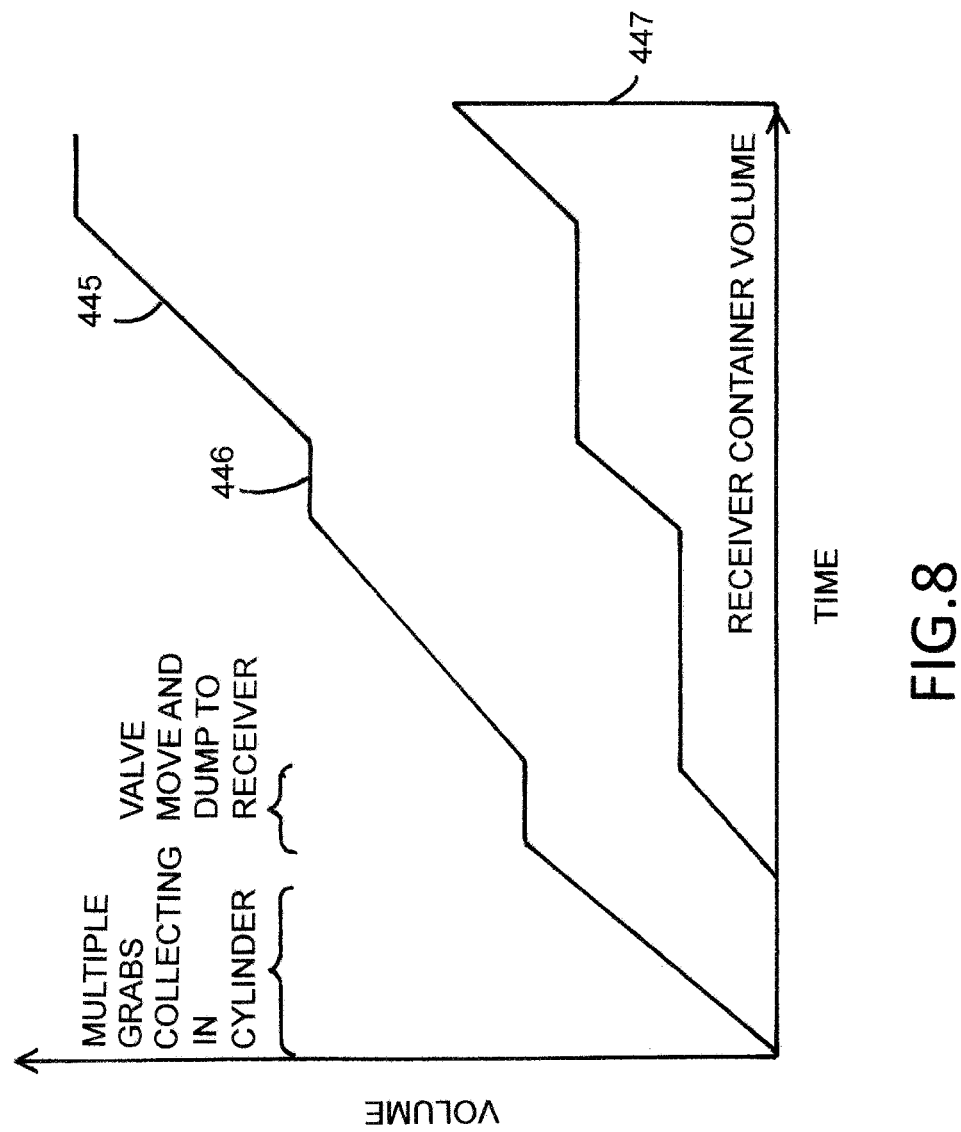
FIG. 8 demonstrates the fast flow process diagram of an embodiment of the present invention.

As shown in diagram of FIG. 8, volume of grab is on the vertical access and time on the horizontal access, the diagonal line 445 indicates the multiple grabs that are collected in the cylinder at once and the horizontal line 446 shows when 3-way control valve is closed to allow dumping into receiver can. Receiver container volume 447 is demonstrated in area below the line 445.

Figure 9:
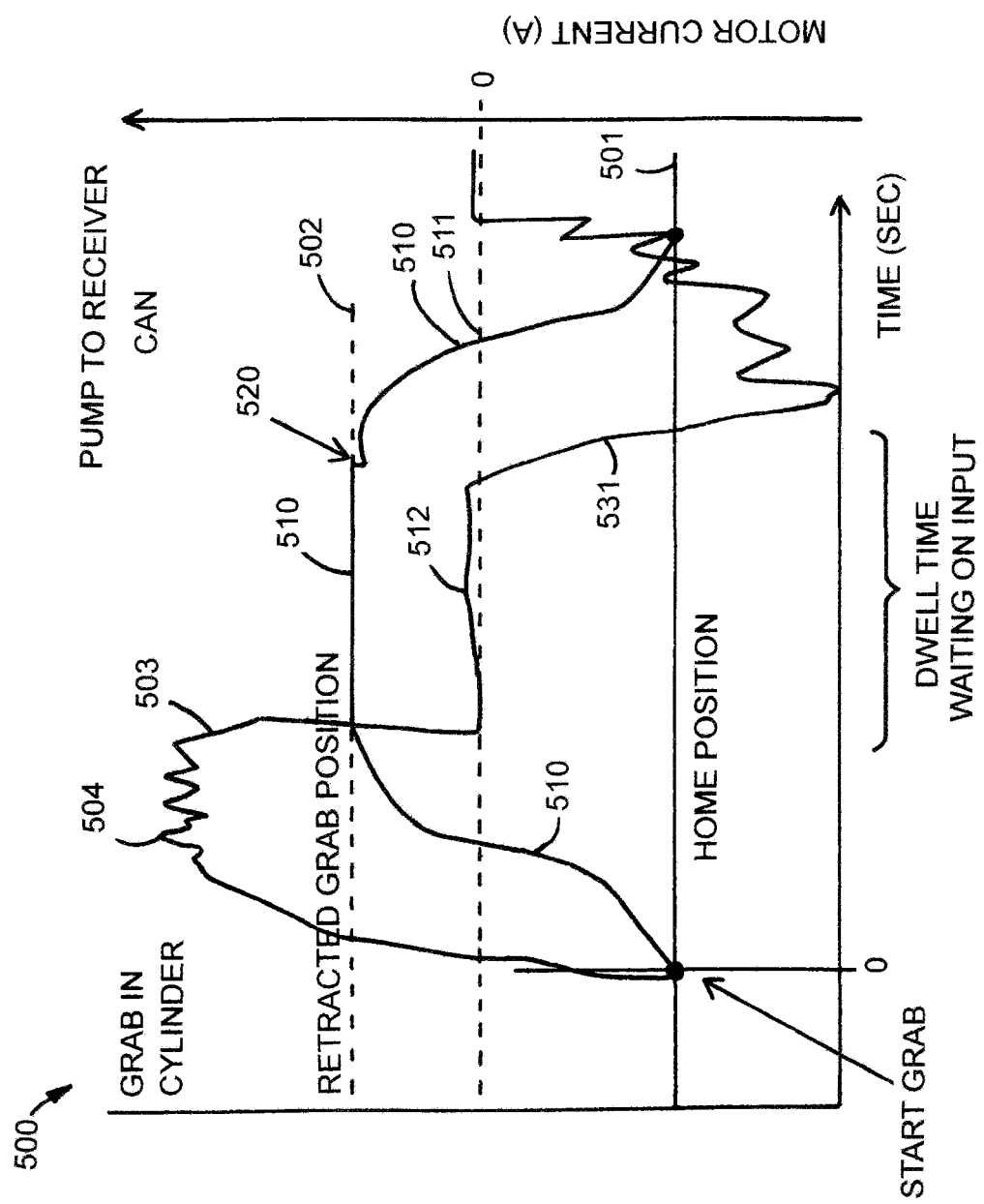
FIG. 9 graphs the power requirement during sampling of a diagnostic monitor of an embodiment of the present invention.

One significant feature of the servo-electric actuated auto sampling is the ability for diagnosis and programmable control of sampling for consistent volume requirements, or varied flow viscosity or material. As shown in diagram on FIG. 9, modelled is a servo drive controller as it draws actuator to grab a sample. Diagnostic capability graph 500 shows extension distance is on the vertical axis where grab in cylinder is at home position 501 and draws into retracted grab position 502. Motor current 503 (or power required) demonstrates the amount of power required to move actuated linear actuator from home position 501 to grab position 502. The amount of current for power required to draw actuator pump from home to retracted grab position tells us many things about the viscosity of the material drawn for sampling, any defects in the actuator pump, defects in the associated valving or plumbing or the amount of volume drawn.

When it is known how much and the characteristic shape of power curve over time is used to operate linear actuator, any differentiation in magnitude and characteristic of power required to operate grabber will tell us that something has changed in the system. Typically the change will be due to some sort of defect in the sampling system.

Referring again to FIG. 9, at time "0" actuator position 510 is in home position 501 and pump is drawn via pump position indicator 510 to retracted grab position 502. As can be seen in line 503, amperage or power required in home position 501 is at a minimum. When actuator is drawn into retracted grab position 502 the amount of current or power rises substantially to draw back linear actuator (following amperage line 503). The maximum level at which amperage reaches upon full draw of actuator demonstrates the maximum power required to make the draw. The area under the power fine 503 tells us the total power required to make a specific draw. Between grabs if the amount of power required to make any particular grab is different from the others or if over time the amount of power required to make any grab increases (or decreases), this can tell us if there is either a defect in the system, clogged line change in flow material, etc.

When actuator is in retracted grab position 502 (follow position line 510), the power required to maintain that position as shown in amperage line 503 is fairly constant. During dump (follow line 511), or pump to a receiver can at trigger input 520, power required decreases substantially, or is drawn into the reverse direction (below zero as indicated, at amperage line lower section 531), to power the dumping in opposite direction as actuator is forced to move arm down back into home position. Similarly, the amount of power required in the reverse direction can tell us about the amount of material grab in the sample as well as the viscosity of the material, as well as any defects along the dumping line system. The controller can be configured to monitor the electric current of a normal sequence, to define magnitude and shape of changes, and thereby determine whether or not the electric current profile over-time indicates any physical change in the system. By demonstrating a change in the amount of power required for the servo-electric to actuate the grabber, problems can be diagnosed remotely via message signal from the servo-electric to some type of controller that thereby communicates on-site to a monitor or off-site via electronic communications.

An additional feature is that the servo-electric actuator grab can allow for an expanded system with varied bites taken over longer periods. Whereas prior art samples are typically collected every 6 hours over the 24-hour day, an expanded electro servo driven auto sampler can include an expanded system that can reduce the number of times that samples must be collected. For instance, in expanded system of the present invention with multiple containers for programmed specified samples, the number of samples removed manually from the system can be reduced to once per day, etc., to comply with FERC and API requirements.

Optionally, weigh scales can be used to measure and determine the amount of sample taken in the sampling containers or cans. These can be used to determine failure if not enough weight is detected in a container and thereby alert of failure. The weigh scale is optional because the servo-electric driven actuator can include feedback, as discussed, in the power required to draw the sampler actuator, and thereby determine the volume amount viscosity etc. of sampling without need for a weigh scale. The present invention with the monitored servo electric driven sampler can detect the amount of sample without weigh scales. Weigh scales can be used as a redundancy for determining issues or failures, in the sampling system.

An additional feature of the servo-electric, drawn auto sampling system is the ability to power a draw or pull of sample in addition to the push or injection into can or dump into can at varied pressures. Prior art systems are built for low pressure (under 100 psi) typically at atmosphere. For instance, when natural gas liquids (NGLs) consist of compressed gas, samples need to be drawn under pressure. An advantage of the electro mechanical actuator is that the force of piston into the can can be done under a constant pressure or under varied pressure systems.

The servo-electric driven actuator provides consistent and constant feedback of the speed of the draw and power required. This gives an indication of flow data remotely via electronic communications. Using the electro mechanical driven system, mote information can be drawn about the performance of the system as well as the features of the sample drawn. Multiple different product flows through pipe can be drawn through the fast flow system with the same actuator of the present invention programmed to handle varied viscosities and material sample.

I claim:

1. A method of sampling a flow of petroleum-based liquid comprising the steps of:
   a. connecting an inflow to extract flowing petroleum-based liquid into a sampling system;
   b. providing an outflow for petroleum-based fluid to exit the sampling system;
   c. allowing petroleum-based fluid to enter through the inlet and flow past an actuator;
   d. closing a control valve thereby bypassing the actuator;
   e. discharging petroleum-based fluid from the actuator into a receiving container;
   f. opening the control valve to reconnect actuator to the petroleum-based fluid flow from inlet; and
   g. drawing a sample into the actuator at a predetermined speed profile prior to said step of discharging;
   wherein said step of drawing is conducted by a servo-electric controlled actuator and further comprising the steps of:
   monitoring power requirement to operate the servo-electric controlled actuator;

modifying the speed profile of said step of drawing based on the at least one reading of pressure, temperature, and/or viscosity of the fluid determined in said step of monitoring.

2. The method of claim 1 wherein said step of closing creates a short-flow loop to allow petroleum-based fluid flows between inlet and outlet.

3. The method of claim 1 further comprising the step of opening a receiver valve after said step of closing.

4. The method of claim 1 wherein said step of drawing is conducted between steps d and e.

5. The method of claim 1 wherein said step of drawing is conducted prior to said step d.

6. The method of claim 1 wherein said step of discharging is conducted by a servo-electric controlled actuator.

7. The method of claim 1 wherein said step of modifying is based on a reading of pressure of the fluid determined in said step of measuring.

8. The method of claim 1 wherein said step of modifying is based on a reading of temperature of the fluid determined in said step of measuring.

9. The method of claim 1 wherein the speed profile is determined based on a flow velocity of the flow.

10. The method of claim 1 wherein said step of modifying is based on a flow velocity of the flow.

11. A method of sampling a flow of petroleum-based liquid in fast loop process comprising the steps of:
   a. connecting an inflow to extract flowing petroleum-based liquid into a sampling;
   system;
   b. providing an outflow for petroleum-based fluid to exit the sampling system;
   c. allowing petroleum-based fluid to enter through the inlet and flow past an actuator;
   d. measuring at least one of pressure, temperature, and/or viscosity of the entering fluid;
   e. closing a control valve thereby bypassing the actuator;
   f. drawing a sample into the actuator at a predetermined speed profile;
   g. discharging petroleum-based fluid from the actuator into a receiving container;
   h. opening the control valve to reconnect actuator to the petroleum-based fluid flow from inlet; and
   i. modifying the speed profile of said step of drawing based on the at least one reading of pressure, temperature, and/or viscosity of the fluid determined in said step of measuring.

12. The method of claim 11 wherein said step of drawing is conducted by a servo-electric controlled actuator.

13. The method of claim 11 wherein said step of drawing is conducted by an actuator, and further comprising the step of monitoring power requirement to operate the actuator.

14. The method of claim 11 wherein said step of modifying is based on a reading of viscosity of the fluid determined in said step of measuring.

15. The method of claim 11 further repeating the steps of allowing, measuring closing, drawing, discharging, after said step of modifying, wherein said step of modifying is conducted via a programmable logic controller.

16. The method of claim 11 wherein said step of modifying is based on a reading of pressure of the fluid determined in said step of measuring.

17. The method of claim 11 wherein said step of modifying is based on a reading of temperature of the fluid determined in said step of measuring.

18. The method of claim 11 wherein the speed profile is determined based on a flow velocity of the flow.

19. The method of claim 11 wherein said step of modifying is based on a flow velocity of the flow.

* * * * *